United States Patent [19]

Nomizo et al.

[11] Patent Number: 5,366,678

[45] Date of Patent: Nov. 22, 1994

[54] METHOD OF MANUFACTURING CUSHION MATERIAL

[75] Inventors: Fumio Nomizo, Toyota, Japan; Takashi Nagase, Birmingham, Mich.

[73] Assignee: Toyota Jidosha Kabushiki Kaisha, Toyota, Japan

[21] Appl. No.: 46,740

[22] Filed: Apr. 16, 1993

[30] Foreign Application Priority Data

Apr. 24, 1992 [JP] Japan .................... 4-106465

[51] Int. Cl.⁵ ............................ B29C 35/02
[52] U.S. Cl. .......................... 264/122; 264/126
[58] Field of Search ......................... 264/122, 126

[56] References Cited

U.S. PATENT DOCUMENTS

| | | | |
|---|---|---|---|
| 4,568,581 | 2/1986 | Peoples, Jr. | 264/126 |
| 4,649,014 | 3/1987 | Tochikawa | 264/555 |
| 4,663,225 | 5/1987 | Farley et al. | 264/126 |
| 5,169,580 | 12/1992 | Marcus | 264/115 |

FOREIGN PATENT DOCUMENTS

| | | |
|---|---|---|
| 212082 | 3/1987 | European Pat. Off. . |
| 214374 | 3/1987 | European Pat. Off. . |
| 3007343 | 9/1981 | Germany . |
| 61-29525 | 2/1986 | Japan . |
| 62-102709 | 5/1987 | Japan . |
| 62-152408 | 7/1987 | Japan . |
| 3121091 | 5/1991 | Japan . |
| 349277 | 7/1991 | Japan . |
| 3170112 | 7/1991 | Japan . |

*Primary Examiner*—Mary Lynn Theisen
*Attorney, Agent, or Firm*—Cushman, Darby & Cushman

[57] ABSTRACT

A method of manufacturing a cushion material for seat pads comprises a step for filling a mold part that will form the cushion material with a mixed fiber containing a thermofusible fiber, a step for engaging this mold part with another mold part, and a step for applying heat to a specific region of the mixed fiber that will form a bottom surface so that the thermofusible fiber in the specific region melts before the thermofusible fiber in the other region of the mixed fiber that will form a sitting surface of the cushion material.

19 Claims, 11 Drawing Sheets

METHOD OF MANUFACTURING CUSHION MATERIAL

BACKGROUND OF THE INVENTION

1. Field of the Invention

This invention relates to a method for manufacturing a cushion material of variable hardness used in car seats or beds.

2. Description of the Related Art

When a cushion material is used for car seat padding, a material M having for example the structure shown in FIG. 15 is desirable in order to improve the comfort of the passengers. This cushion material m is so formed that the surface of the material on which the load acts, i.e. the surface on which the passenger sits, has a low hardness A, and the hardness of the material progressively increases to a medium hardness B and greater hardness C towards the lower part of the material (this variation of hardness is defined as a "hardness gradient").

Conventionally, the following methods were used for manufacturing a cushion material M having a predetermined hardness gradient.

In the first of these methods, layers of cushion material of different hardness were stuck together-using an adhesive, e.g. a liquid urethane adhesive. This method however involves a complex process, and manufacturing costs could not be reduced.

In the second method, a mold was filled with a mixed cotton containing a thermofusible fiber (i.e. a fiber having a core/sheath composite structure wherein the reelting point of the sheath is no less than 30° C. below that of the core melting fiber), and the cotton was subjected to thermal compression so as to form a cushion material (Japanese Patent Application Laid-Open No. 3-170112). This method overcomes the drawback of the first method.

In this second method, in order to obtain a cushion material having a different hardness in different parts of the material, the density is increased in certain regions by compressing the fiber base to different extents in different regions. Alternatively, a cushion material having a lower hardness in some regions than others was obtained by lining predetermined regions of a mold with a thermofusible fiber that had been given a suitable degree of support by a binder.

By varying the compression applied to the thermofusible fiber to be molded by heating, the density of the cushion material can be varied in different parts of the material, and a cushion material of varying hardness can be obtained. The aforesaid Patent Publication does not however disclose how to make the density of the cushion material vary continuously, and the thermal compression is also difficult to manufacture the cushion material having a continuously varying density.

Although it is generally possible to adjust the fiber content using a thermofusible fiber supported by a binder, it renders the manufacturing process complex. Further, in high hardness parts of a cushion material obtained by this method, the thermofusible fiber content is high and so the high thermofusible fiber content leads to a decrease of elasticity.

SUMMARY OF THE INVENTION

The object of this invention is to provide a method of manufacturing a cushion material having a continuously varying hardness and a desired hardness gradient.

According to one aspect of this invention, the method of manufacturing a cushion material comprises a step for filling a mold part used for forming the cushion material with a mixed fiber containing a thermofusible fiber, a step for engaging another mold part with the first mold part, and a step for applying heat to a specific region of the mixed fiber in the mold so that said thermofusible fiber in said specific region of said mixed fiber melts before said thermofusible fiber in said other region of said mixed fiber. This heating may be accomplished by, for example, covering the mold part used for forming one surface of the cushion material by an insulator and heating the whole mold, or heating the mold part locally using panel heaters or infrared heaters. By heating the mixed fiber in the mold in this way, the mixed fiber which will form one surface of the cushion material gradually moves toward the mixed fiber which will form another surface of the cushion material. As a result, a density, i.e. hardness, of the cushion material at the other surface becomes greater than that at the initial surface, so a predetermined density gradient, i.e. a predetermined hardness gradient, can be set up from the initial surface to the other surface.

By suitably adjusting the density of the mixed fiber filling one mold part, a cushion material having a predetermined hardness gradient can be fashioned. If the hardness variation of the cushion material is to be larger, for example, the density of the mixed fiber filling the mold is increased, while if the hardness variation is to be smaller, the density of the mixed fiber is decreased. Varying the density of the mixed fiber varies the internal compression of the mixed fiber in the mold.

According to this invention, it is preferable that the step for engaging the other mold part with the first mold part is performed in such a way as to press the other mold part against the mixed fiber filed in the first mold part. It is moreover preferable that the step for applying heat is performed while the compression force of pressing the other mold part is adjusted. According to one embodiment of this invention, the two mold parts are engaged such that they are not completely closed in order that the compression force acting on the mixed fiber during heating can be adjusted, and the mixed fiber is compressed by applying a constant compression force to another mold part in the heating step until the two mold parts are closed together. The compression in the mold is thereby maintained constant, and a cushion material having a large hardness gradient can be formed.

According to this invention, the heating temperature in the heating step may be varied. By suitably adjusting the temperature programming schedule, a cushion material having a predetermined hardness gradient can be obtained.

Further, according to this invention, a specific region of the mixed fiber in the mold can first be heated locally, and then the whole of the mixed fiber can be heated uniformly. In this way, a cushion material having a predetermined hardness gradient can be formed in a short time.

The cushion material manufactured by this invention may be used for a material for a seat pad and the specific region of the mixed fiber may form a bottom surface of the seat pad.

DETAILED DESCRIPTION OF THE PREFERRED EMBODIMENTS

Figure 1:
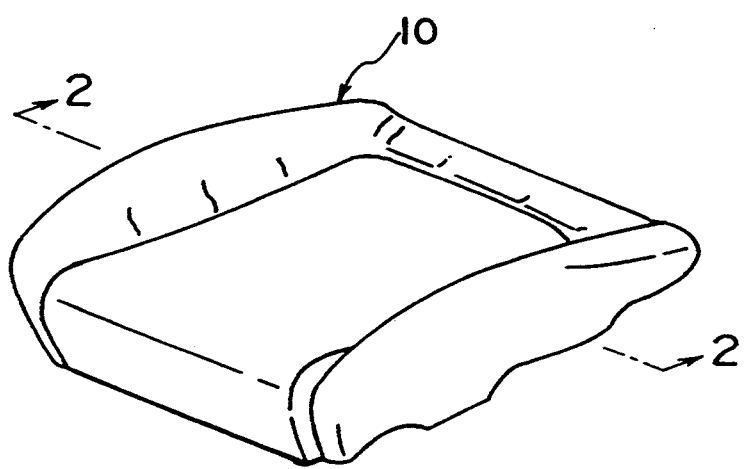
FIG. 1 is a view in perspective of a seat pad formed by the method of manufacturing a cushion material according to this invention.
Figure 2:
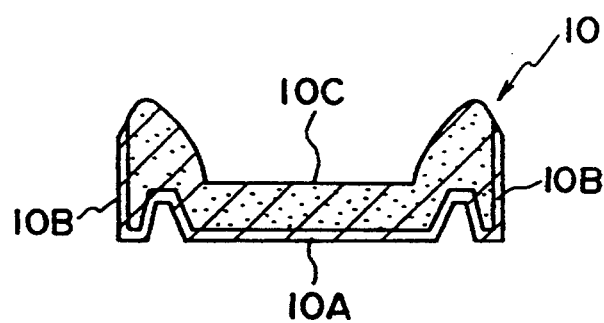
FIG. 2 is a cross-sectional view taken in line 2—2 of FIG. 1.

The method of manufacturing the cushion material of this invention used in manufacturing a car seat pad 10 of the type shown in FIG. 1 will now be described. This car seat pad 10, as shown in FIG. 2, is so formed that the bottom 10A and sides 10B have a high density (part with shading), and the Upper part 10C has a low density. As the upper part 10C has a low hardness, the seat is comfortable for passengers to sit on. Moreover, in seats which have springs, the bottom 10A has a high hardness so there is no need for any reinforcement in the area in contact with the springs. Further, the sides 10B have a high hardness, so the passenger's hips are firmly gripped.

A method will now be described for manufacturing a cushion material used as the seat pad 10.

EXAMPLE 1

Figure 3:
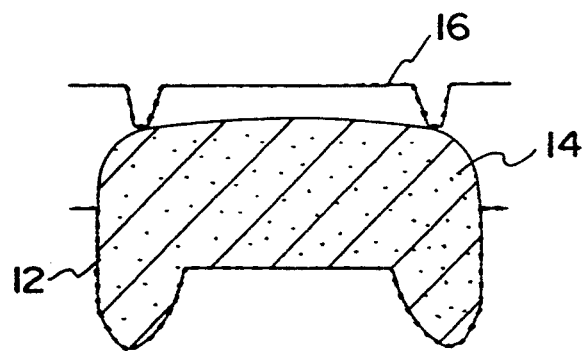
FIG. 3 is a cross-sectional view showing the step in the process of forming a seat pad by the method of manufacturing a cushion material according to the first example of this invention after the lower mold part has been filled with mixed cotton and before the upper mold part is closed over the lower mold part.
Figure 4:
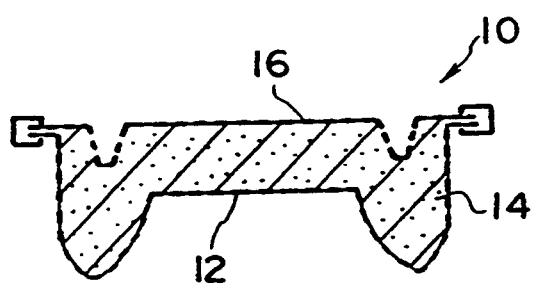
FIG. 4 is a cross-sectional view showing the step in the process of forming a seat pad by the method of manufacturing a cushion material according to the first example of this invention after the upper mold part is closed over the lower mold part.

As shown in FIG. 3, a lower mold part 12 for forming the upper surface of the seat pad 10 is filled with a mixed cotton 14 containing a thermofusible fiber (e.g. "ELK" manufactured by Teijin K.K.). This lower mold part 12 composed by punching metal having a surface area of which 53% is comprised of hole openings. Next, as shown in FIG. 4, an upper mold part 16 for forming the lower surface of the seat pad 10 which, like the lower mold part 12, also composed by punching metal, is closed over the lower mold part 12. The amount of mixed cotton 14 to be filled is measured taking account of the inner volume of the mold such that the apparent overall density of the seat pad 10 will be approximately 30 kg/m$^3$. As can be seen from FIGS. 3 and 4, the mixed cotton 14 is compressed when the upper mold part is closed over the lower mold part, and a predetermined internal compression is produced.

Figure 5:
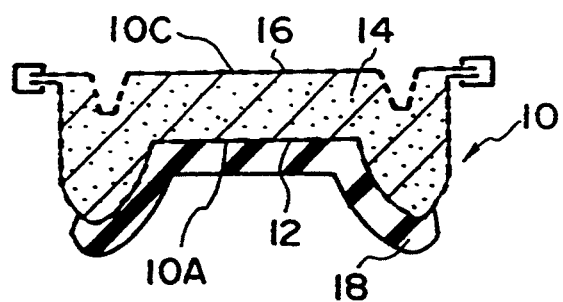
FIG. 5 is a cross-sectional view showing the process of forming a seat pad by the method of manufacturing a cushion material according to the first example of this invention wherein the lower mold part has been provided with an insulating material.

Next, the lower mold part 12 is covered with an insulating material 18 as shown in FIG. 5, the mold is introduced in a heating furnace (not shown), and heated at a temperature of 200° C. for approximately 80 minutes. By heating in this manner, more heat is supplied to the upper mold part 16 than to the lower mold part 12, so the lower surface 10C of the seat pad 10 formed in the upper mold part 16 has a greater apparent density than the upper surface 10A of the seat pad 10 formed in the lower mold part 12. This is because some of the mixed cotton 14 gradually moves from the upper surface 10A to the lower surface 10C of the seat pad 10. The apparent density of the upper surface 10A of the seat pad 10 is therefore less than the apparent density of the lower surface 10C of the seat pad 10, and a predetermined density gradient, i.e. a hardness gradient, is set up from the upper surface 10A to the lower surface 10C so as to give the desired characteristics of the seat pad.

In order to confirm the efficacy of the manufacturing method of the cushion material of Example 1, comparison experiments were performed using other manufacturing methods.

As Comparative Example 1, the filled lower mold part 12 and upper mold part 16 were introduced in a heating furnace under the same conditions as those of Example 1 but without the covering of the insulating material 18, and the mold was heated uniformly at a temperature of 200° C. for approximately 60 minutes. According to this method, the amount of heat supplied to the upper mold part 16 and lower mold part 12 is the same, and the central region therebetween is heated later.

As Comparative Example 2, the filled lower mold part 12 and upper mold part 16 were introduced in a heating furnace under the same conditions as those of Example 1, but without the covering of the insulating material 18. The initial temperature of the furnace was ambient temperature (room temperature), the temperature was increased by temperature programming to 200° C. at a rate of 4° C./minute, and heating was then continued at 200° C. for 30 minutes. According to this method, the upper mold part 16 and lower mold part 12 are gradually heated at a constant rate of temperature rise. The temperature of the whole seat pad 10 therefore increases almost uniformly until the molding temperature of 200° C. is attained.

Figure 6:
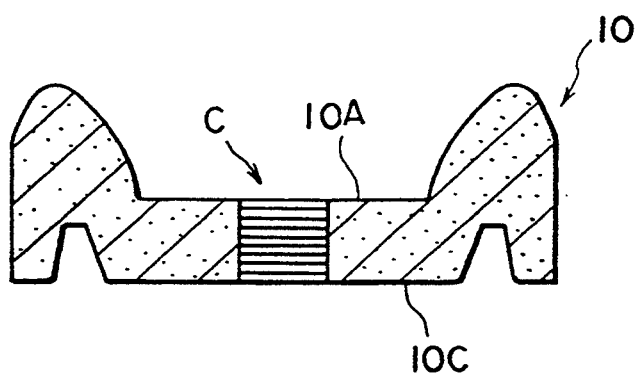
FIG. 6 is a cross-sectional view showing a seat pad formed by the method of manufacturing a cushion material according to the first example of this invention.
Figure 7:
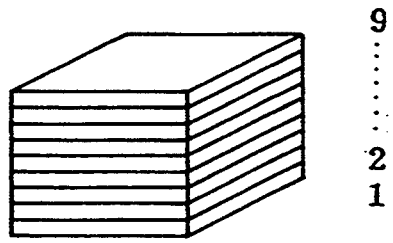
FIG. 7 is a perspective view showing a test piece cut into 9 layers parallel to the upper surface of the seat pad.

Test pieces of the central region C of the seat pad 10 (see FIG. 6) molded by the methods of Example 1, Comparative Example 1 and Comparative Example 2 were cut out as shown in FIG. 7. Nine test piece layers, parallel to the upper surface 10A and numbered one to nine from the bottom layer up, were cut out as shown in FIG. 7, and their apparent densities were measured. Their apparent densities are shown in Table 1.

TABLE 1

| APPARENT DENSITY OF LAYERS kg/m$^3$ | | | |
|---|---|---|---|
| | Ex. 1 | Comp. Ex. 1 | Comp. Ex. 2 |
| Average density | 29.5 | 28.5 | 30.6 |
| 1 | 46.4 | 34.6 | 32.6 |
| 2 | 34.4 | 28.2 | 30.1 |
| 3 | 32.9 | 25.4 | 30.3 |
| 4 | 29.7 | 25.3 | 29.5 |
| 5 | 28.0 | 24.8 | 30.4 |
| 6 | 26.2 | 26.0 | 30.5 |
| 7 | 24.7 | 27.8 | 30.8 |
| 8 | 24.3 | 31.7 | 31.7 |
| 9 | 23.4 | 34.7 | 30.3 |

From Table 1, it can be seen that in Comparative Example 1, the apparent density of the center (Layer No. 5) is the smallest, i.e. 24.8 kg/m$^3$, that the density gradient from the center to the bottom layer (Layer No. 1) is approximately 1.4 (34.6/24.8), and that the apparent densities of the top layer and bottom layer are effectively the same.

Also, in Comparative Example 2, the density is effectively constant in every test piece (Layer No. 1: 32.6, Layer No. 5: 30,4, Layer No. 9: 30.3), and there is almost no density gradient.

It is seen that in Example 1, the density gradually increases from the top layer (Layer No. 9) to the bottom layer, and that the density gradient is as high as 2.0 (Layer No. 1: 46.4, Layer No. 9: 23.4). Further, the apparent density of the bottom layer is 46.4 kg/m$^3$. A large hardness gradient is therefore set up from the upper surface 10A to the lower surface 10C of the seat pad 10, and a sufficiently high hardness is attained at the lower surface 10C. This shows that the seat pad manufactured according to the method of Example 1 has the characteristics required of a seat pad.

Next, an experiment was performed to determine how the density gradient of the seat pad 10 so formed, varies according to the magnitude of the compression produced in the mixed cotton 14.

The following Table 2 shows the relation between the apparent densities and internal compressions of mixed cotton Samples 1 to 4 filling the mold in order to form different seat pads.

TABLE 2

| | Sample 1 | Sample 2 | Sample 3 | Sample 4 |
|---|---|---|---|---|
| Apparent Density kg/m$^3$ | 18.1 | 23.8 | 29.5 | 37.3 |
| Compressive Stress g/cm$^2$ | 0 | 1.5 | 6.0 | 12.0 |

As shown in Table 2, for Sample 1, the amount of mixed cotton 14 filling the mold was chosen to be the same as the volume of the mold parts, hence no internal compression of the cotton 14 was produced after closing the mold. For Sample 4, the amount of mixed cotton 14 filling the mold parts was chosen such that the apparent density of the whole seat pad 10 was 37.3 kg/m$^3$ and the internal compression was 12.0 g/cm$^3$. For Samples 2 and 3, the mold was filled with the cotton 14 so as to respectively give the apparent densities shown in Table 2, the corresponding compressions having the values shown in the Table.

After filling the mold and closing it, the Samples 1 to were heated according to the method described in Example 1, and the apparent density of each layer was measured.

TABLE 3

| APPARENT DENSITY OF LAYERS kg/m$^3$ | | | | |
|---|---|---|---|---|
| | Sample 1 | Sample 2 | Sample 3 | Sample 4 |
| Average density | 18.1 | 23.8 | 29.5 | 37.3 |
| 1 | 20.1 | 32.8 | 46.4 | 60.4 |
| 2 | 19.4 | 28.1 | 34.4 | 45.2 |
| 3 | 18.7 | 24.7 | 32.9 | 40.9 |
| 4 | 19.1 | 23.5 | 29.7 | 38.4 |
| 5 | 18.2 | 23.0 | 28.0 | 33.3 |
| 6 | 18.0 | 21.3 | 26.2 | 32.5 |
| 7 | 17.2 | 20.6 | 24.7 | 29.2 |
| 8 | 16.5 | 19.9 | 24.3 | 29.9 |
| 9 | 16.5 | 19.5 | 23.4 | 28.8 |
| Density gradient | 1.2 | 1.7 | 2.0 | 2.1 |

As shown in Table 3, in the case of Sample 1 (internal compression 0), the density gradient from the top layer (Layer No. 9) to the bottom layer (Layer No. 1) is approximately 1.2 (20.1/16.5). Comparing the density gradients of Sample 1 and Samples 2, 3 and 4, it is seen that the gradient of Sample 2 is approximately 40% higher than that of Sample 1, and that the gradients of Samples 3 and 4 are as much as 65% and 100% higher respectively than that of Sample 1. These results show that, by producing an internal compression in the mixed cotton 14, a seat pad 10 having a higher density gradient, i.e. a high hardness gradient, can be formed. Further, by controlling this internal compression, a seat pad 10 having a desired hardness gradient can be formed.

In Example 1, a predetermined internal compression was produced in the mixed cotton 14. A seat pad 10 having a gentle hardness gradient can however be manufactured by filling the mold with the same volume of mixed cotton 14 as that of the mold parts so that no internal compression is produced. EXAMPLE 2

Figure 11:
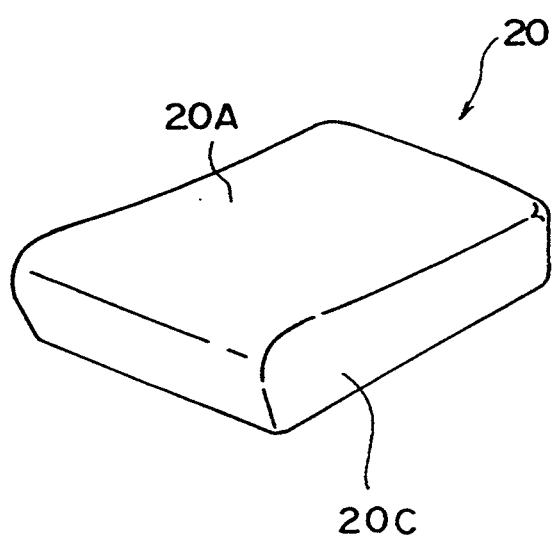
FIG. 11 is a perspective view of a seat pad formed by the method of manufacturing a cushion material according to the second example of this invention.

In this Example 2, the case of manufacturing a seat 20 forming the sitting surface of a chair (FIG. 11) is given as an example instead of the seat pad 10.

Figure 8:
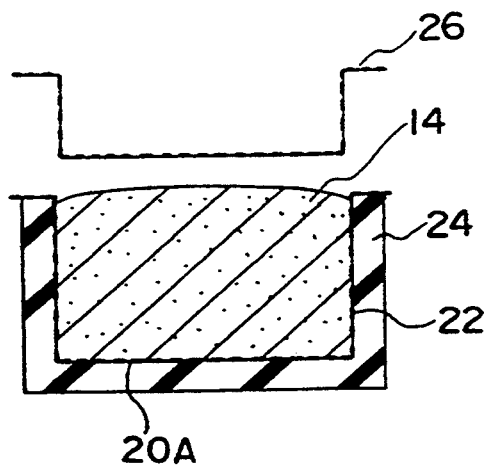
FIG. 8 is a cross-sectional view showing the process of forming a seat by the method of manufacturing a cushion material according to the second example of this invention.

As shown in FIG. 8, a rectangular lower mold part 22 forming an upper surface 20A of the seat 20 was filled with the mixed cotton 14 containing a thermofusible fiber. The outer surface of this lower mold part 22 is covered with an insulating material 24. In this Example, the amount of mixed cotton 14 filling the mold part is chosen such that the apparent density of the seat 20 will be approximately 30 kg/m$^3$ (corresponding to that of the seat pad 10 of Example 1).

Figure 9:
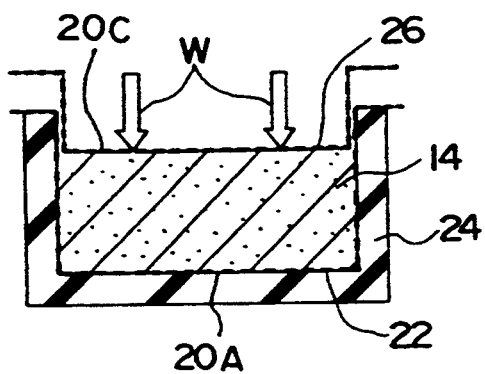
FIG. 9 is a cross-sectional view showing the process of forming a seat by the method of manufacturing a cushion material according to the second example of this invention.
Figure 10:
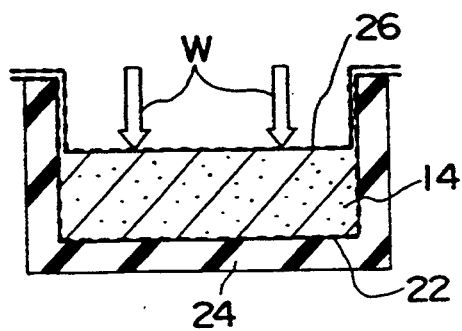
FIG. 10 is a cross-sectional view showing the process of forming a seat by the method of manufacturing a cushion material according to the second example of this invention.

Next, as shown in FIG. 9, a flanged lid 26 which can close over the lower mold part 22 is laid on the surface 20C of the mixed cotton 14, and a constant external force W is applied in the direction of arrows shown in FIG. 9. This external force W may for example be of the order of 4 g/cm$^2$. The force W balances the internal compression produced in the mixed cotton 14 so that the lid 26 does not sink down completely, and remains in an intermediate position as shown in FIG. 9. The lower mold part 22 filled with the mixed cotton 14 and the lid 26 are then introduced in a heating furnace, and heated at a temperature of 200° C. for approximately 80 minutes. As the heating proceeds, the mixed cotton 14 becomes softer, so the lid 26 gradually sinks further down. Finally, the lid 26 has sunk completely so as to close the lower mold part 22 as shown in FIG. 10.

In this Example 2, therefore, the internal compression in the mixed cotton 14 is maintained constant until the lid 26 has fully sunk and the lower mold part is closed. Accordingly, a seat 20 (FIG. 11) having a higher density gradient, i.e. a higher hardness gradient, can be obtained than in Example 1 where the internal compression falls as the mixed cotton 14 in the mold melts. In this Example, the external force W was assumed to be constant, however the density gradient can be easily adjusted by varying this external force during the heating. EXAMPLE 3

Figure 12:
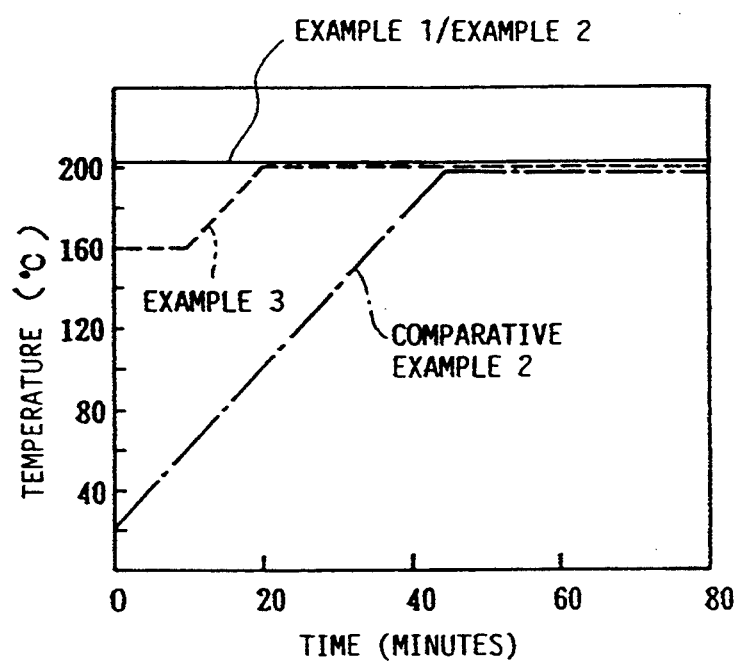
FIG. 12 is a graph showing the difference in heating schedules between the first, second and third examples of this invention and the second comparative example 2.

In Example 3, the lower mold part 12 was filled with the mixed cotton 14, closed and covered with insulating material as shown in Example 1. This assembly was preheated in a heating furnace at 160° C. for approximately 15 minutes, the temperature increased to 200° C. during 5 minutes, and heating continued at this temperature for 60 minutes. The heating schedule is shown graphically in FIG. 12 compared to that of other Examples. According to this method, a seat pad having a smaller density gradient than that of the seat pad 10 of Example 1 is obtained.

A cushion material having a predetermined hardness gradient can therefore be formed according to the manufacturing method of Example 1 by controlling the preheating time. EXAMPLE 4

Figure 13:
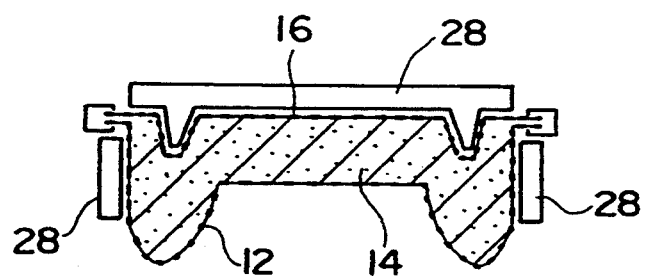
FIG. 13 is a cross-sectional view showing the heating by panel heaters of a cushion material according to the fourth example of this invention.
Figure 14:
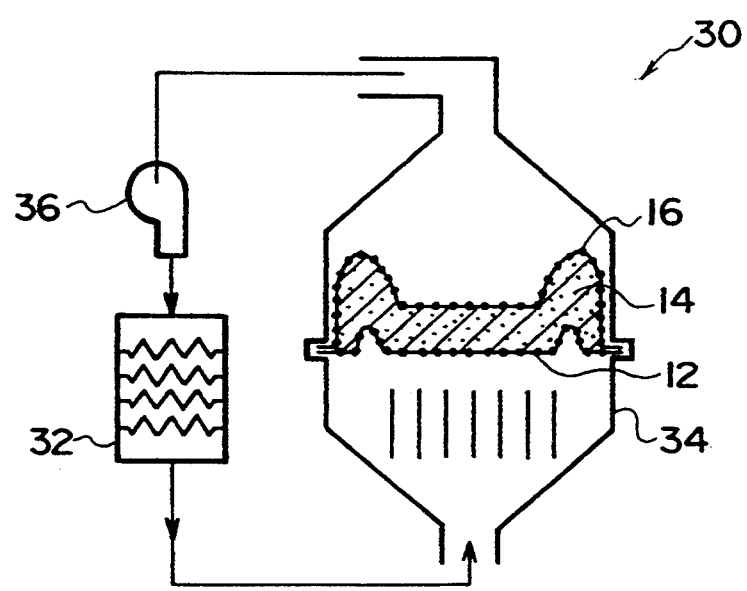
FIG. 14 is a cross-sectional view of a through type heating device and a sample installed in such a device used in the manufacture of a cushion material according to the fourth example of this invention.
Figure 15:
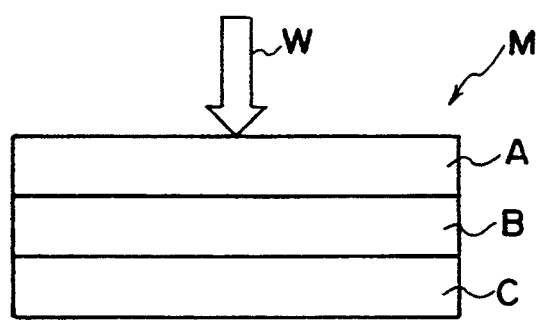
FIG. 15 is a schematic view of a cushion material showing the hardness difference required of such a material.

In this Example, a mold was filled with the mixed cotton 14 in the same way as in Example 1. Panel heaters 28 heated to a temperature of 200° C. were then brought into contact with the upper mold part 16 and lateral walls of the lower mold part (corresponding to the sides of the seat pad 10) as shown in FIG. 13, and the heating continued for 5 minutes.

Next, the panel heaters 28 were removed, and the mold installed in a through type heating device 30. This through type heating device 30 consists essentially of a hot air generator 32, a through type heating jig 34, and a fan 36 for sending heat produced by the hot air generator 32 through the jig 34. The lower mold part and upper mold part 16 are uniformly heated in this jig 34 for a period of 3 minutes.

The seat pad formed by the method of this Example 4 had the same hardness gradient as that of Example 1. Further, this method offers an advantage in that the seat pad can be molded in a short time.

As described hereintofore, the cushion material of this invention can be given any desired density gradient by varying the heating schedule and method of heating the mixed cotton lining the mold, varying the density of the cotton, or varying the closing pressure Of the mold using this invention, therefore, a cushion material having a predetermined hardness gradient may easily be manufactured.

What is claimed is:

1. A method of manufacturing a cushion material comprising:
   filling a mold part for forming a cushion material with a mixed fiber material containing a thermofusible fiber,
   engaging said mold part with another mold part, and continuously varying a hardness between two surfaces of said cushion material by applying heat to a specific region of said mixed fiber material in the engaged mold parts so that said thermofusible fiber in said specific region of said mixed fiber material melts before said thermofusible fiber in another region of said mixed fiber.

2. A method of manufacturing a cushion material according to claim 1 wherein outer regions of said engaged mold parts excluding those adjacent to said specific region of said mixed fiber are covered by an insulating material and said engaged mold parts are then heated so that said thermofusible fiber in said specific region of said mixed fiber material melts before said thermofusible fiber in said another region of said mixed fiber material.

3. A method of manufacturing a cushion material according to claim 1 wherein said thermofusible fiber in said specific region of said mixed material fiber in said molds is made to melt before said thermofusible fiber material in other regions of said mixed fiber material by locally heating outer region of said molds adjacent to said specific region of said mixed fiber material.

4. A method of manufacturing a cushion material according to claim 1 wherein the step for applying heat to a specific region of said mixed fiber material is performed by means of one of a panel heater, an infrared heater and a high frequency induction heater.

5. A method of manufacturing a cushion material according to claim 3 wherein outer region of said mold parts adjacent to said specific region of said mixed fiber material is locally heated, and said engaged mold parts are then heated.

6. A method of manufacturing a cushion material according to claim 1 wherein said mold part is filled with said mixed fiber material while adjusting a density of said mixed fiber material so as to obtain a cushion material having a predetermined hardness.

7. A method of manufacturing a cushion material according to claim 1 wherein the heating temperature is varied during the heating process.

8. A method of manufacturing a cushion material according to claim 1 wherein said mold parts are engaged with one another by closing said other mold part over said mold part.

9. A method of manufacturing a cushion material comprising:
   a step for filling a mold part for forming a cushion material with a mixed fiber material containing a thermofusible fiber,
   a step for engaging said mold part with another mold part by pressing said other mold part against said mixed fiber material filled in said mold part,
   and a step for applying heat to a specific region of the mixed fiber material in said engaged mold parts so that said thermofusible fiber in said specific region of said mixed fiber material melts before said thermofusible fiber in said other region of said mixed fiber material melts before other parts, while adjusting a compression force for pressing said other mold part.

10. A method of manufacturing a cushion material according to claim 9 wherein a constant compression force is applied to said mixed fiber material during said heat applying step until a volume of said mixed fiber material reaches a predetermined volume.

11. A method of manufacturing a cushion material according to claim 10 wherein said mold parts are engaged without closing said other mold part over said mold part.

12. A method of manufacturing a cushion material for a seat pad comprising:

filling a mold part for forming a cushion material with a mixed fiber material containing a thermofusible fiber, engaging said mold part with another mold part, and continuously varying a hardness between a sitting and a bottom surface of said cushion material by applying heat to a region of said mixed fiber material that will form said bottom surface of said cushion material so that the thermofusible fiber in said region of said mixed fiber material melts before the thermofusible fiber in another region of said mixed fiber material that will form said sitting surface of the cushion material.

13. A method of manufacturing a cushion material according to claim 12 wherein an outer region of said mold part that will form said sitting surface of the cushion material is covered by an insulating material, and the engaged mold parts are then heated.

14. A method of manufacturing a cushion material according to claim 12 wherein said region of the mixed fiber material that will form the bottom surface of the cushion material is locally heated.

15. A method of manufacturing a cushion material according to claim 12 wherein said region of the mixed fiber material that will form the bottom surface of the cushion material is locally heated, and said engaged mold parts are then heated.

16. A method of manufacturing a cushion material according to claim 12 wherein the heating temperature is varied during said heat applying step.

17. A method of manufacturing a cushion material according to claim 12 wherein said mold part is filled with the mixed fiber material while a density of said mixed fiber material is adjusted so as to obtain a cushion material having a predetermined hardness.

18. A method of manufacturing a cushion material according to claim 12 wherein the step of engaging one mold part with the other mold part is performed by pressing said another mold part against the mixed fiber material filled in the mold part, and said heat applying step is performed while a compression force for pressing said another mold part is adjusted.

19. A method of manufacturing a cushion material according to claim 18 wherein a constant compression is applied to said mixed fiber material during said heat applying step until the volume of said mixed fiber material reaches a predetermined volume.

* * * * *